June 3, 1969  B. M. VANDERBILT ET AL  3,447,572

REINFORCED THERMOSET PLASTIC PIPE

Original Filed Oct. 2, 1962

B. M. Vanderbilt
C. F. Marsden, Jr. Inventors

By Jack Matalon Attorney

United States Patent Office 3,447,572
Patented June 3, 1969

3,447,572
REINFORCED THERMOSET PLASTIC PIPE
Byron M. Vanderbilt, Westfield, and Charles F. Marsden, Jr., Bedminster, N.J., assignors to Esso Research and Engineering Company, a corporation of Delaware
Continuation of application Ser. No. 227,719, Oct. 2, 1962, which is a continuation-in-part of application Ser. No. 780,941, Dec. 17, 1958. This application Nov. 8, 1966, Ser. No. 592,949
Int. Cl. B32b 1/08
U.S. Cl. 138—141       11 Claims

ABSTRACT OF THE DISCLOSURE

Reinforced thermoset plastic pipe is prepared in which at least one layer of the pipe (such as the inner liner, outer cover, or both) comprises a cured admixture of a peroxide-curable rubber polymer, an unsaturated polyester and a peroxide having a half-life of at least 15 minutes at 275° C.

---

Figure 1:
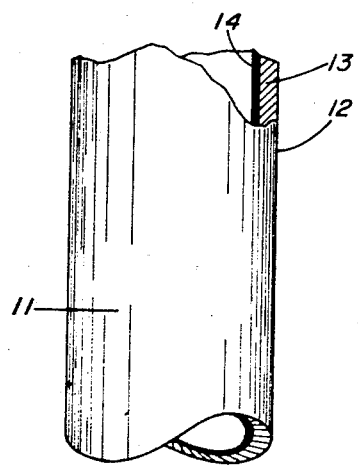

This application is a continuation of application Ser. No. 227,719, filed Oct. 2, 1962, now abandoned, which in turn in a continuation-in-part of application Ser. No. 780,-941, filed Dec. 17, 1958, now abandoned.

This invention relates ot an improved rubbery vulcanizate and more particularly to a method of both improving the processability of a rubber mixture and increasing the physical properties of a vulcanizate.

It is known to prepare synthetic rubbery polymers with subsequent compounding and curing to provide final vulcanizates. In the past, softeners have been employed to improve the processability, e.g., the extrusion of rubbery polymers. However, softeners, per se, act as diluents and lower the physical properties of the cured vulcanizates. Saturated polyesters have been employed as softeners but rubber vulcanizates obtained therefrom are weaker than when no softener is used. Use of unsaturated softeners such as linseed oil, cracked petroleum oils, and allyl esters are generally unsatisfactory in that they react preferentially with curatives of the sulfur and dioxime types leaving the rubber largely uncured.

It has now been found that the use of a combination of an unsaturated polyester as softener and peroxide as vulcanizing agent for the rubbery mixture makes possible good processability and the physical properties of the vulcanize are not impaired by the softener and may actually be increased.

In accordance with one embodiment of this invention, an unsaturated rubbery polymer is admixed and blended with an unsaturated polyester-peroxide catayslt combination and cured to a final vulcanizate. The rubbery polymers that fall within the purview of this invention are those which are unsaturated and therefore include NBR (a copolymer of a major amount of butadiene and a minor amount of acrylonitrile formerly called GR–N or ABR); SBR (formerly GR–S, copolymer of a major proportion of butadiene and a minor proportion of styrene); unvulcanized natural rubber; rubber polybutadienes and polyisoprenes; neoprene; and the rubbery copolymer of ethylene and propylene. Any unsaturated natural or synthetic rubber that is curable with organic peroxide, including the organic peroxide curable saturated rubbery copolymer of ethylene and propylene, is suitable for use in the instant novel process.

NBR (formerly ABR) is the organic peroxide curable saturated rubbery copolymer obtained by polymerizing a butadiene hydrocarbon having the general formula

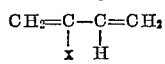

wherein $x$ is hydrogen or alkyl with a compound having the general formula

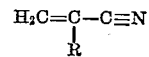

wherein R is hydrogen or alkyl. The butadiene hydrocarbon should be 50–85% of the total weight of the reactants. One method of preparation is as follows. The mixture of the reactants may be emulsified with water in the presence of an emulsifying agent, e.g., a soap. The emulsion is polymerized by means of a peroxide catalyst with shaking or stirring at a temperature between about 30°–100° C. The polymerized products are in the form of a latex-like emulsion which can be coagulated by freezing or by adding a suitable acid and/or alkali metal salt. The preferred polymer is prepared by reacting 75 to 55% of butadiene with 25 to 45% of acrylonitrile. The preparation of this polymer is described in U.S. Patent 1,973,000 which is incorporated herein by reference.

For many uses such as inner liners or other coatings for glass fiber reinforced thermoset plastic tubing and pipe cured through the use of a peroxide, it is preferred to blend the NBR rubbery polymer with polyvinyl chloride. This can be accomplished in the compounding step as by Banbury mixing or the latices of the rubbery and the polyvinyl chloride may be mixed nad coprecipitated. It is preferred to blend 100 to 300 parts polyvinyl chloride per 100 parts by weight of the NBR rubbery copolymer.

In accordance with this invention, an unsaturated polyester is incorporated in the rubbery polymer. These unsaturated polyesters as defined in this invention may be derived by the condensation of polyhydric alcohols and polycarboxyl compounds and have an unsaturated carbon bond in their structure. Appropriate unsaturated polyesters are obtained by condensing or esterifying alpha-beta unsaturated dicarboxylic acids, such as members of the fumaric acid series, for example, maleic acid, fumaric acid, itaconic acid, their anhydrides and simple derivatives thereof containing a functioning ethylenic group, with appropriate polyhydric alcohols, for example, glycols such as ethylene glycol, diethylene glycol, other polyethylene glycols, propylene glycol-1,2, glycerol and the like. It is apparent that the polyesters of the ethylenically unsaturated dicarboxylic acids may also include minor amounts of other polyhydric alcohols such as pentaerythritol, sorbitol, mannitol or the like. In general, these polyhydric alcohols include from 4 to 6 hydroxyls. Likewise, the acids and anhydrides of the fumaric acid series employed may contain amounts of other carboxylic acids and anhydrides, such as, succinic acid and phthalic acid and the corresponding anhydrides. These unsaturated polyesters are described in detail in U.S.P. 2,688,006 and 2,769,742 which are incorporated herein by reference. They are available commercially under trade names such as, Selectron, Paraplex, Vibrin, and Laminac. Other unsaturated polyesters which are particularly suitable for use in this invention are the polyfumarates and polymaleates of alkylene oxide condensates of diphenylolpropane, prepared in accordance with the process described in U.S. Patent 2,634,251, Apr. 17, 1953, the disclosure of said patent being incorporated herein by this reference to it.

Specific dihydric alcohols shown in this patent for use in esterification with the fumaric acid series of unsaturated dicarboxylic acids are 2,2-di(4-beta hydroxy ethoxy phenyl)propane, 2,2-di(4-beta hydroxy ethoxy phenyl)butane, the polyoxyethylene ether of isopropylidene diphenol wherein both phenolic hydroyls are oxyethylate and the average number of oxyethylene groups per mol is 2.6, and the polyoxypropylene ether of 2-butylidene diphenol wherein both phenolic hydroxyls are oxypropylated and the average number of oxypropylene groups per mol is 2.5. The specific polyester employed in Examples I, IV and VI hereinbelow is of this type and is the fumaric acid polyester of the ethylene oxide condensation product of Bisphenol-A which is 2,2-bis(4 hydroxy phenyl) propane in which the dihydric alcohol, i.e., the condensation product contains for the most part one ethoxy group attached through each phenolic hydroxyl group. Its method of preparation is disclosed in Example I of U.S. Patent 2,634,251. It is preferred to compound the rubbery copolymer with between about 10 and about 50 parts of the unsaturated polyester per 100 parts by weight of the rubbery polymer.

Although not essential to the success of the instant novel process for preparing the herein-described novel vulcanizates and laminates employing these vulcanizates, it is desirable to incorporate between about 5 and about 50% by weight, preferably between about 25 to about 40%, based on the amount of unsaturated polyester used, of an ethylenically unsaturated monomeric cross-linking agent along with the unsaturated polyester plasticizer. The various styrenes, e.g., styrene, vinyl toluene, p-chloro styrene, o-chlorostyrene, 2,4-dichloro styrene, etc., may be employed but for practical purposes some of these are so volatile under the temperature and pressure conditions employed that they vaporize away and are partially lost before they have had an opportunity to react with the unsaturated polyester present. The preferred ethylenically unsaturated monomeric cross-linking agents are such compounds as diallyl phthalate, triallyl cyanurate, divinyl adipate, divinyl benzene, and compounds of similar or higher boiling points.

It is also essential in carrying out the herein disclosed invention, to include a free radical catalyst, such as an organic peroxide in the rubbery polymer in combination with the aforementioned unsaturated polyester. These catalysts may include peroxides, diperoxides, per-esters, and hydroperoxides, e.g., dicumyl peroxide, and tertiary butyl perbenzoate, cumene hyroperoxide, ditertiary butyl peroxide, ditertiary butyl, diperphthalate, or any mixture thereof. The preferred catalysts are dicumyl peroxide and cumene hydroperoxide. Especially desirable are the peroxides which have long half lives at the rubber processing temperatures employed. Dicumyl peroxide at 275° F. has a half life of about one hour, but, at the same temperature, 2,5-dimethyl 2,5-di(tertiary butyl peroxy) hexyne-3 and 2,5- dimethyl 2,5 di(tertiary butyl peroxy) hexane have half lives of 6.5 and 2.5 hours, respectively. The other specific peroxides, above set forth, have half lives measured at 275° F. as follows:

| | Hours |
|---|---|
| Tertiary butyl perbenzoate | 0.5 |
| Cumene hydroperoxide | 78.0 |
| Ditertiary butyl peroxide | 5.0 |
| Ditertiary butyl diperphthalate | 0.27 |

Any organic peroxide having a half life of at least 15 minutes, measured at 275° F., is suitable for curing the herein described novel compositions since a vulcanization of those compositions is usually satisfactorily completed in about 45 minutes if carried out at a temperature of at least 275° F. It is preferred to add between about 0.2 and about 5 parts of the peroxide to 100 parts by weight of the rubbery polymer.

In addition to being compounded with the unsaturated polyester and the peroxide, other materials such as stabilizers, antioxidants, fillers, and accelerators, can be included within the rubber polymer mix. Any known method can be employed for the compounding step, e.g., Banbury mixing, mill mixing and the like.

After compounding, the rubbery polymer is cured to provide a final vulcanizate. Methods for curing include steam pressure, hot air, and mold curing. A particularly satisfactory method is to cure the compounded rubbery polymer in molds at a temperature ranging between 280° and 330° F. for a time interval ranging from 5 minutes to 2 hours.

Thus, in accordance with this invention a product can be prepared from a rubbery polymer mix having good processability. However, the vulcanizate after curing his increased tensile and modulus strength. Through the use of this invention, the NBR-polyvinyl chloride mixtures are particularly applicable as inner liners and/or as outer covers for glass fiber reinforced thermoset plastic pipe. Such a liner may be applied as a tape or as a calendered sheet on glass cloth. Such liners also may be used as an intermediate layer in laminates. Use of unsaturated polyesters with SBR (prepared by known methods, e.g., as described in U.S.P. 1,938,730) and other rubbers are particularly applicable for mechanical rubber goods where good moldability and high strength vulcanizates are required. This new class of softeners is also highly effective for rubbers used in the calendering of cloth.

Reinforced thermoset plastic laminates may not only have these novel vulcanizates as outer coatings or liners, in the case of pipe structures, but they may constitute inner layers of the laminates of the sandwich type as well. The reinforced layers are conventionally the glass fiber or cloth reinforced resins, for example, in which the resin as a resinifiable mix is the impregnant and an organic peroxide curing system is employed. Such mixes may be formed of the normally liquid $C_4$–$C_6$ diolefin polymers, i.e., polybutadiene, or liquid copolymers of $C_4$–$C_6$ diolefins with minor amounts of ethylenically unsaturated monomeric armoatic hydrocarbons, i.e., the copolymer of butadiene with styrene, or they may be the unsaturated polyesters described hereinabove. In either case since both the novel vulcanizates of the resinifiable impregnated resin resinforced compositions are curable with organic peroxides, the layers of novel vulcanizable mix and reinforced impregnant may be cocured while in intimate layer to layer contact to produce the final cured laminate. Although reinforced resin impregnated systems of the phenol-formaldehyde and epoxy types are also employed in conjunction with their lamination with the novel vulcanizable mixes herein described, and although in these cases peroxide cures are efficacious only with respect to the novel vulcanizable mixes, cocuring of such laminates is readily achieved by effecting the layer to layer contact and heating the laminate, in the case of the phenol-formaldehyde system, or employing the suitable acids or amine curing reagents in the case of the epoxy layers, and heating. Cocures have been found to give much greater adhesion between the respective laminate layer interfaces than separate cures of the separate individual layers followed by heat treatment of the combined layers or cementing of the built up layers of the laminate after initial and independent layer curing to the thermoset stage.

Figure 2:
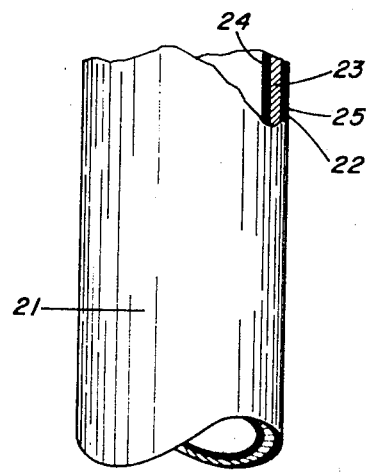

This invention will be better understood from the following drawings in which:

FIG. 1 is a fragmentary view of a plastic pipe containing an inner liner prepared from the improved blends of this invention; and FIG. 2 is a fragmentary view of a plastic pipe containing an inner liner as well as an outer cover prepared from the improved blends of this invention.

As shown in FIG. 1 of the drawing, the pipe structure 11 comprises a glass fiber reinforced-thermoset plastic pipe body 12 to which is chemically bonded a smooth impervious inner liner 14 prepared from the improved blends of this invention. The pipe body 12 comprises the cured coherent body of thermosetting resin composition with which the glass fibers 13 were coated. The inner liner 14 may be applied to the body 12 as a tape or as a calendered sheet on glass cloth. The chemical bonding of inner liner 14 to body 12 can be achieved by co-curing the liner and body while they are in intimate layer to layer contact to produce the final cured pipe 11.

In FIG. 2, the pipe structure 21 comprises a glass fiber-reinforced thermoset plastic pipe body 22 to which is chemically bonded both a smooth impervious inner liner 24 and an impervious outer liner 25. The body 22 comprises the cured coherent body of thermosetting resin composition with which the glass fibers 23 were coated. For the purposes of this invention, either the inner liner 24 or the outer liner 25 must be prepared from the improved blends of this invention and desirably both liners make use of the improved blends of this invention. As in the case of FIG. 1, the inner and outer liners 24 and 25 may be applied as tapes or calendered sheets on glass cloths and chemical bonding can be obtained as described above with respect to FIG. 1.

The following examples are submitted to illustrate but not to limit this invention.

Example I

One hundred parts of a butadiene-acrylonitrile rubbery copolymer containing about 35% of combined acrylonitrile was blended with 100 parts of a powder of polyvinyl chloride on a rubber mill with various other compounds as listed below to provide compounds A, B, and C.

| Compounds | Parts by weight | | | |
|---|---|---|---|---|
| | A | B | C | D |
| Copolymer | 100 | 100 | 100 | 100 |
| Polyvinyl chloride | 100 | 100 | 100 | 100 |
| Zinc oxide | 5 | 5 | 5 | 5 |
| Philblack A [1] | 40 | 40 | 40 | 40 |
| Stearic acid | 1 | 1 | 1 | 1 |
| Dicumyl peroxide | 1.5 | 1.5 | 1.5 | 1.5 |
| Unsaturated polyester [2] | 20 | | | 12 |
| Diallyl phthalate | | 20 | | 8 |
| Tributoxy-ethyl-phosphate | | | 20 | |

[1] A high abrasion furnace black of excellent processing characteristics was used in the compounding of the rubber stocks.
[2] Fumaric acid polyester of the ethylene oxide condensation product of Bisphenol-A.

Each of the compounded rubbery copolymers was subsequently cured in a press mold at a temperature of 285° F. for one hour and portions of each were further postcured at 300° F. for 2 hours. The physical properties of the vulcanizates were determined after both the 1 and 3 hours of curing as follows:

| Vulcanizate | Time of cure (hours) | Tensile (p.s.i.) | 10% modulus (p.s.i.) |
|---|---|---|---|
| A | 1 | 4,510 | 3,200 |
| A | 3 | 5,050 | 4,260 |
| B | 1 | 3,140 | 1,500 |
| B | 3 | 3,470 | 1,850 |
| C | 1 | 3,510 | 1,590 |
| C | 3 | 3,940 | 1,680 |
| D | 1 | 3,800 | 1,800 |
| D | 3 | 4,150 | 2,800 |

Vulcanizates (A and D samples) at 1 and 3 hours cure had ultimate elongations of 150 and 130% for A and 250 and 200% for D.

The above example demonstrates that the physical properties of a vulcanizate are vastly improved by providing a butadiene-acrylonitrile copolymer blended with polyvinyl chroride, modifying the blend with an unsaturated polyester and curing in the presence of a peroxide catalyst. It is critical for the success of this invention to incorporate both an unsaturated polyester and a peroxide catalyst in the preparation of the rubber. Vulcanization with sulfur, sulfur compounds, and various dioximes are not applicable for rubber compositions containing unsaturated polyesters.

Example II

Rubbery compounds D, E, and F were prepared by blending 100 parts by weight of a copolymer of 65% butadiene and 34% acrylonitrile with 100 parts of polyvinyl chloride and compounding this blend as indicated below:

| Compounds | Parts by weight | | |
|---|---|---|---|
| | D | E | F |
| Copolymer | 100 | 100 | 100 |
| Polyvinyl chloride | 100 | 100 | 100 |
| Zinc oxide | 5 | 5 | 5 |
| Philblack A | 40 | 40 | 40 |
| Dicumyl peroxide | 1.5 | 1.5 | 1.5 |
| Unsaturated Polyester [1] | 25 | | |
| Another Unsaturated Polyester [2] | | 25 | |
| A third Unsaturated Polyester [3] | | | 25 |

[1] Maleic anhydride reacted with diethylene glycol.
[2] Itaconic acid reacted with glycerol.
[3] Diethyl fumarate reacted with propylene glycol.

Curing these compounded rubbery polymers at a temperature of 280° F. for one hour with a postcure at 300° F. for two hours provides vulcanizates of the aforementioned improved physical properties.

Example III

Vulcanizates were prepared by compounding a rubbery copolymer of butadiene with styrene with the materials listed in the table below. The compounded rubber was subsequently cured for 1 hour at 290° F. Samples were cut from each vulcanizate therefrom, and the tensile strength and modulus for each were determined.

| Compounds | Parts by weight | | |
|---|---|---|---|
| | 1 | 2 | 3 |
| Copolymer | 100 | 100 | 100 |
| Aminox [1] | 3 | 3 | 3 |
| Zinc oxide | 5 | 5 | 5 |
| Philblack A | 30 | 30 | 30 |
| Dicumyl peroxide | 1.25 | 1.25 | 1.25 |
| Saturated polyester | 30 | | |
| Unsaturated Polyester [2] | | 30 | |
| Diallyl phthalate | | | 30 |

[1] An antioxidant, low-temperature reaction product of diphenylamine and acetone.
[2] Condensation product of diethylene glycol and maleic anhydride.

| Vulcanizate | Tensile strength (p.s.i.) | 100% modulus (p.s.i.) |
|---|---|---|
| 1 | 680 | 100 |
| 2 | 1,375 | 420 |
| 3 | 1,105 | 90 |

This example demonstrates that an unsaturated polyester as a softener in conjunction with a peroxide catalyst provides a vulcanizate with superior physical properties as compared to the use of a saturated polyester alone or an allyl diester alone.

Example IV

The rubbery copolymer of 65% butadiene and 35% acrylonitrile was blended with polyvinyl chloride and other compounding ingredients as shown in the table below:

| Compounds | Parts by weight | | |
|---|---|---|---|
| | 4 | 5 | 6 |
| Copolymer | 50 | 50 | 50 |
| Polyvinyl chloride | 150 | 150 | 150 |
| Aminox [1] | 1.5 | 1.5 | 1.5 |
| Dyphos [2] | 7.5 | 7.5 | 7.5 |
| Philblack A | 60 | 60 | 60 |
| Dicumyl peroxide | 0.625 | 0.625 | 0.625 |
| Unsaturated Polyester [3] | 60 | | |
| Diallyl phthalate | | 60 | |
| Saturated Polyester | | | 60 |

[1] Low temperature reaction product of diphenylamine and acetone.
[2] Stabilizer, which is a dibasic lead phosphite.
[3] Fumaric acid polyester of the ethylene oxide condensation product of Bisphenol-A.

Each of the above rubbery compounds was cured for 1 hour at 290° F. The vulcanizate therefrom, with the unsaturated polyester therein, had a tensile strength of 6,155 p.s.i. In contrast, each of the other two vulcanizates had a tensile strength of less than 3,000 p.s.i.

Example V

Compounds were added to a rubbery polymer of isoprene as follows:

| Compounds | Parts by weight | | |
|---|---|---|---|
| | 7 | 8 | 9 |
| Polyisoprene | 100 | 100 | 100 |
| Zinc oxide | 6 | 6 | 6 |
| Stearic acid | 4 | 4 | 4 |
| Dicumyl peroxide | 1.5 | 1.5 | 1.5 |
| Dioctyl phthalate | | 20 | |
| Unsaturated Polyester [1] | | | 20 |

[1] Condensation product of diethylene glycol and maleic anhydride.

Each of the above compounded rubbers was cured at 300° F. for 1 hour. The physical properties of each of the resulting vulcanizates were determined as indicated in the table herebelow:

| Vulcanizate | Tensile strength (p.s.i.) | 100% modulus (p.s.i.) |
|---|---|---|
| 7 | 1,540 | 105 |
| 8 | 960 | 70 |
| 9 | 1,755 | 145 |

The above example demonstrates that a superior product is obtained by compounding a rubbery polymer with the combination of an unsaturated polyester and a peroxide catalyst.

Example VI

The following admixture was compound in a Banbury mixer to a uniform composition and dumped at 310° F.

| Compounds: | Parts by weight |
|---|---|
| NBR (45% combined acrylonitrile) | 100 |
| Polyvinyl chloride | 100 |
| Aminox | 3 |
| Dyphos | 3 |
| Philblack-A | 40 |
| Stearic acid | 1 |
| Unsaturated polyester [a] | 15 |
| Diallyl phthalate | 10 |

[a] Fumaric acid polyester of the ethylene oxide condensation product of Bisphenol=A.

A portion of this composition was banded on a steel roll mill whose rolls were cooled internally to 130° F. by means of water. To this portion there was then added with mixing to a homogeneous blend:

| | Parts by weight |
|---|---|
| Zinc oxide | 5 |
| Dicumyl peroxide, 40% on HAF black | 7.5 |

This blend was then calendered to a sheeting of 0.012 inch in thickness while maintaining the calender rolls only hot enough to allow for good processability. Some scorching occurred as evidenced by a tendency of the film to "eye-hole."

A similar batch was prepared in an identical manner except that the dicumyl peroxide was replaced by a like amount of 2,5 dimethyl-2,5-di(tertiary butyl peroxy) hexyne-3. No scorching occurred during the calendering operation and a uniform smooth sheeting was obtained. Both samples as well as the vulcanizates of Examples I through V which contained unsaturated polyesters as additives were of improved resistance to attack by chemicals and to dissolution by solvents. Both samples of Example VI also exhibited tensile strengths and 100% modulus measurements as good or better than compounds A, D, 2, 4 and 9 of the preceding examples.

Having described the general nature and specific embodiments of the present invention, the true scope is now particularly pointed out in the appended claims.

What is claimed is:

1. A reinforced thermoset plastic pipe containing at least one layer of a cured admixture of:
   (a) a peroxide curable rubbery polymer selected from the group consisting of the copolymer of butadiene with acrylonitrile, the copolymer of butadiene with styrene, natural rubber, polybutadiene, polyisoprene, polychloroprene and ethylene-propylene copolymer;
   (b) 10 to 50 parts by weight, per 100 parts of said rubbery polymer, of an unsaturated polyester formed by reacting an alpha-beta-ethyleneically unsaturated dicarboxylic acid selected from the group consisting of members of the fumaric acid series and their anhydrides with a polyhydric alcohol; and
   (c) 0.2 to 5 parts by weight, per 100 parts of said rubbery polymer, of an organic peroxide having a half-life of at least 15 minutes when measured at 275° F.

2. The plastic pipe of claim 1 wherein the admixture contains polyvinyl chloride.

3. The plastic pipe of claim 1 wherein the mixture contains, in association with the unsaturated polyester, about 5 to about 50% by weight, based on the amount of said unsaturated polyester, of a monomeric crosslinking compound having at least one ethylenically unsaturated carbon to carbon bond.

4. The plastic pipe of claim 1 wherein the polyhydric alcohol portion of the unsaturated polyester is an alkylene oxide condensate of diphenylol propane.

5. The plastic pipe of claim 1 wherein at least one layer is an inner liner for said plastic pipe.

6. The plastic pipe of claim 1 wherein at least one layer is an outer cover for said plastic pipe.

7. The plastic pipe of claim 1 wherein the reinforcing agent used is fibrous glass.

8. A reinforced thermoset plastic laminate containing at least one layer of a cured admixture of:
   (a) a peroxide curable rubbery polymer selected from the group consisting of the copolymer of butadiene with acrylonitrile, the copolymer of butadiene with styrene, natural rubber, polybutadiene, polyisoprene, polychloroprene and ethylene-propylene copolymer;
   (b) 10 to 50 parts by weight, per 100 parts of said rubbery polymer, of an unsaturated polyester formed by reacting an alpha-beta-ethylenically unsaturated dicarboxylic acid selected from the group consisting of members of the fumaric acid series and their anhydrides with a polyhydric alcohol; and
   (c) 0.2 to 5 parts by weight, per 100 parts of said rubbery polymer, of an organic peroxide having a half-life of at least 15 minutes when measured at 275° F.

9. The plastic laminate of claim 8 wherein the admixture contains polyvinyl chloride.

10. The plastic laminate of claim 8 wherein the polyhydric alcohol portion of the unsaturated polyester is an alkylene oxide condensate of diphenylol propane.

11. The plastic laminate of claim 8 wherein the reinforcing agent used in fibrous glass.

References Cited

UNITED STATES PATENTS

| | | | |
|---|---|---|---|
| 2,448,584 | 9/1948 | Frosch | 260—75 |
| 2,602,037 | 7/1952 | Nelb | 161—204 X |
| 2,609,353 | 9/1952 | Rubens et al. | 260—862 |
| 2,625,526 | 1/1953 | Sparks et al. | 260—873 |
| 2,815,043 | 12/1957 | Kleiner et al. | 138—76 |
| 2,845,411 | 7/1958 | Willis | 260—85.1 X |
| 2,969,812 | 1/1961 | De Ganahl | 138—25 |
| 3,018,266 | 1/1962 | Lundberg | 161—195 X |
| 3,044,913 | 7/1962 | Lundberg | 161—195 X |
| 3,235,625 | 2/1966 | Ballini et al. | 260—873 |

HAROLD ANSHER, Primary Examiner.

U.S. Cl. X.R.

138—146, 153; 161—185, 195, 198, 233, 241, 248